United States Patent
Ting et al.

(10) Patent No.: US 8,313,106 B2
(45) Date of Patent: Nov. 20, 2012

(54) ENERGY SAVING SEAL WITH MAIN LIP AND DUST LIP HINGE POINT

(75) Inventors: Shih Chieh Ting, Kuala Lumpur (MY); Muhammad Mujahid Azni, Kuala Lumpur (MY); Mohd Imran Rosly, Kuala Lumpur (MY)

(73) Assignee: Freudenberg-NOK General Partnership, Plymouth, MI (US)

( * ) Notice: Subject to any disclaimer, the term of this patent is extended or adjusted under 35 U.S.C. 154(b) by 332 days.

(21) Appl. No.: 12/754,717

(22) Filed: Apr. 6, 2010

(65) Prior Publication Data

US 2011/0241296 A1    Oct. 6, 2011

(51) Int. Cl.
*F16J 15/32* (2006.01)
(52) U.S. Cl. ............................................. 277/562
(58) Field of Classification Search .................. 277/353, 277/549, 551, 560, 562
See application file for complete search history.

(56) References Cited

U.S. PATENT DOCUMENTS

| | | | | |
|---|---|---|---|---|
| 3,005,648 A | * | 10/1961 | Christensen | 277/560 |
| 3,743,305 A | * | 7/1973 | Berens et al. | 277/574 |
| 4,522,411 A | * | 6/1985 | Burgan | 277/552 |
| 4,844,484 A | * | 7/1989 | Antonini et al. | 277/561 |
| 5,244,215 A | * | 9/1993 | Cather et al. | 277/309 |
| 5,398,942 A | * | 3/1995 | Duckwall et al. | 277/353 |
| 5,556,112 A | * | 9/1996 | Brandt | 277/560 |
| 5,967,527 A | * | 10/1999 | Fabro et al. | 277/560 |
| 8,042,814 B2 | * | 10/2011 | Walter et al. | 277/552 |
| 2006/0186604 A1 | * | 8/2006 | Berdichevsky | 277/559 |
| 2008/0157481 A1 | * | 7/2008 | Berdichevsky | 277/402 |
| 2011/0221143 A1 | * | 9/2011 | Toth et al. | 277/549 |

* cited by examiner

*Primary Examiner* — Vishal Patel
(74) *Attorney, Agent, or Firm* — David J. Sepanik, Esq.; Harness, Dickey & Pierce, P.L.C.

(57) ABSTRACT

A seal includes a mounting portion having an outer diameter surface adapted to be received in a bore. An axially extending leg extends from the mounting portion. A hinge portion is disposed at an end of the axially extending leg. The hinge portion has a generally round cross-section with a larger diameter than the end of the axially extending leg. A main seal lip and a dust lip extend from the hinge portion.

14 Claims, 4 Drawing Sheets

ENERGY SAVING SEAL WITH MAIN LIP AND DUST LIP HINGE POINT

FIELD

The present disclosure relates to seals and more particularly, to a seal having a main lip and dust lip hinge point.

BACKGROUND AND SUMMARY

This section provides background information related to the present disclosure which is not necessarily prior art.

Energy saving radial shaft seals are known to improve sealing performance by reducing friction between the seal lip and crankshaft through a reduction in radial load of 50% when compared to sprung rubber lip seals and 75% when compared to PTFE lip seals. Not only does the friction improvement reduce power consumption and improve fuel economy, it also reduces the amount of heat generated at the seal lip and crankshaft interface.

The Energy Saving Seal operates by pumping oil through a precision molded spiral interfacing with a rotating shaft which directs oil back into the engine or transmission. With the spiral pattern and its multiple points contacting the shaft, there is less risk associated with poor shaft conditions such as porosity or other imperfections, which are often the downfall of the sprung lip seal with its single point of contact with the shaft.

In some applications an energy saving seal needs to resist vacuum pressures that can cause the seal lip to lift off the shaft. According to the present disclosure, a seal is provided including a mounting portion having an outer diameter surface adapted to be received in a bore and a radially inwardly extending leg. An axially extending leg extends from an inner end of the radially inwardly extending leg. A hinge portion is disposed at an end of the axially extending leg, the hinge portion having a generally round cross-section with a larger diameter than said end of said axially extending leg where the hinge portion is attached. A main seal lip and a dust lip each extend from the hinge portion. The hinge portion allows the main lip and the dust lip to pivot while maintaining the angle between the main lip and dust lip, wherein during vacuum pressure, the hinge portion helps in making the dust lip engage the shaft faster thus producing a sealed contact if the main lip lifts off during the vacuum pressure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
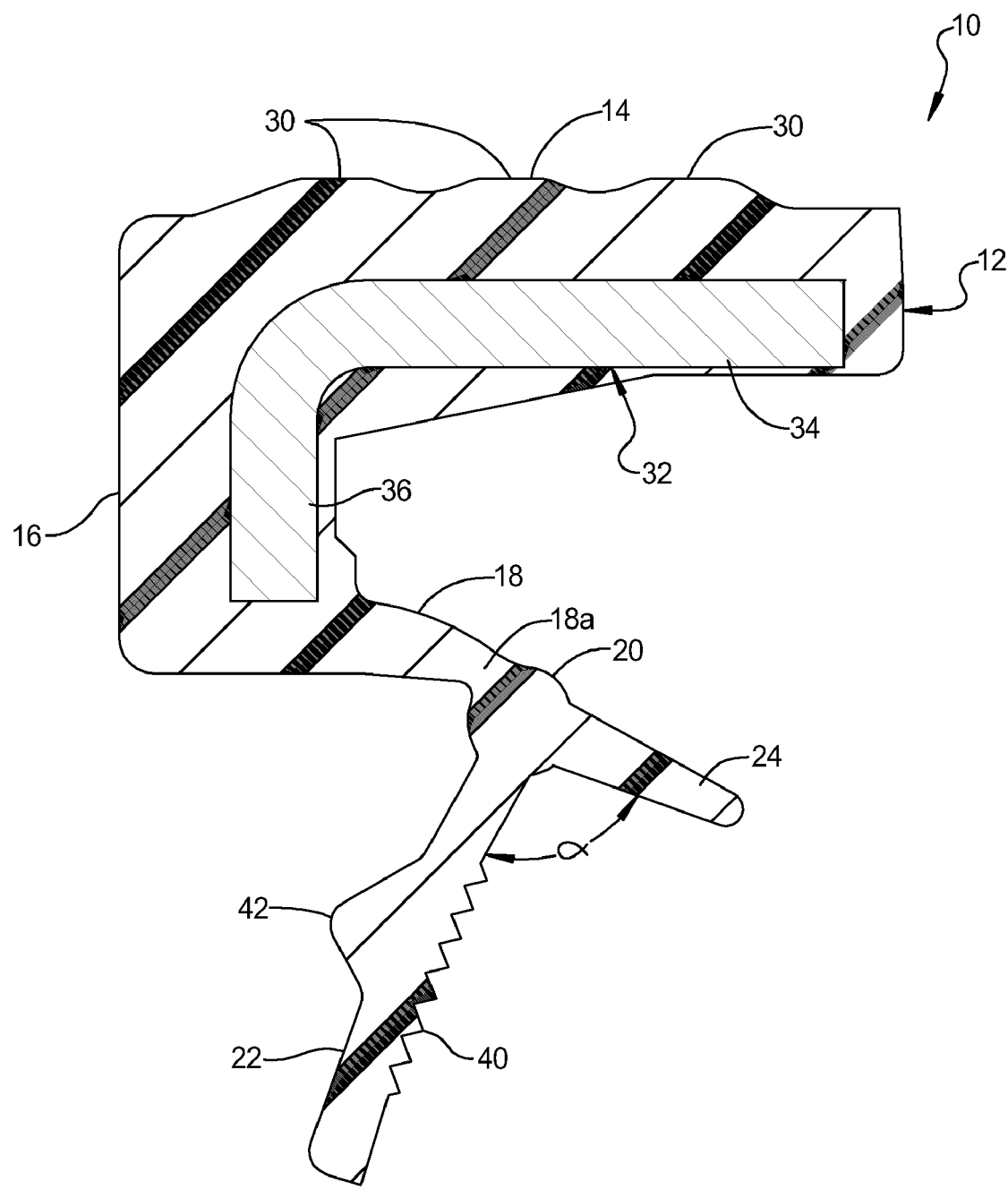
FIG. 1 is a cross-sectional view of the seal according to the principles of the present invention with the seal in an un-assembled state.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

With reference to FIGS. 1-4, an energy saving seal 10 according to the principles of the present disclosure, will now be described. The seal 10 includes a mounting portion 12 that can have an outer diameter surface 14 adapted to be received in a bore and can include a radially inwardly extending portion 16. An axially extending leg 18 extends axially from a radially inner end of the radially inwardly extending portion 16 of the mounting portion 12. A hinge portion 20 is disposed at an end of the axially extending leg 18. The hinge portion 20 can have a generally round cross section, although other shapes can be utilized. The hinge portion 20 preferably has a diameter that is larger than the end portion 18a of the axially extending arm where the hinge portion 20 is connected. A main seal lip 22 extends from the hinge portion 20. A dust lip 24 also extends from the hinge portion 20.

Figure 2:
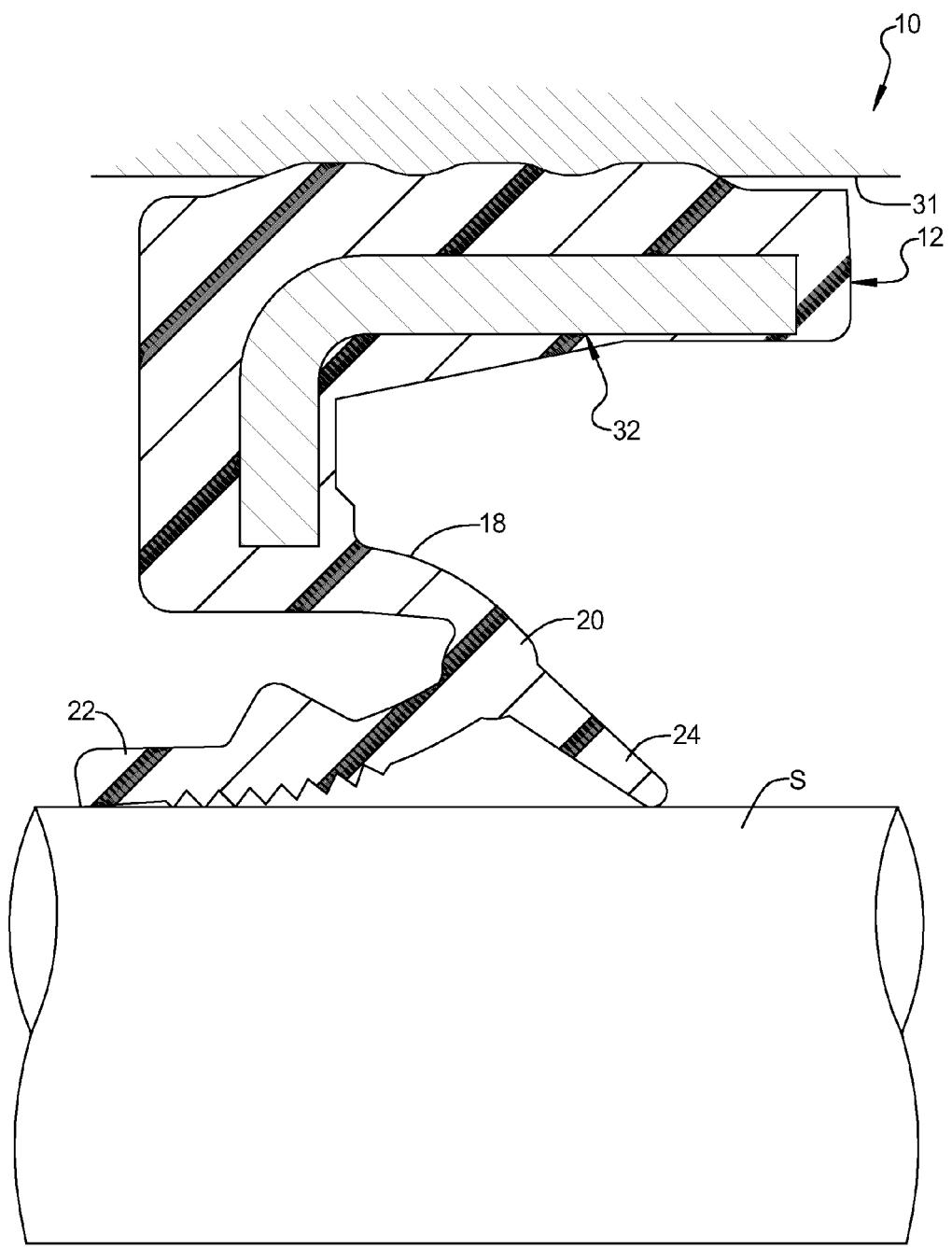
FIG. 2 is a cross-sectional view of the seal shown in FIG. 1 with the seal in an assembled state.

The outer diameter surface 14 of the mounting portion 12 can be provided with raised beads 30 that enhance the sealing engagement between the outer diameter surface 14 and an interior surface of a bore 31 (FIG. 2). The mounting portion 12 can take on many forms, as are well known in the art, and the embodiment shown herein can include a metal insert 32 that can include an axially extending portion 34 that can structurally support the outer diameter surface 14 for better sealing engagement with the bore 31. The insert 32 can include a radially inwardly extending portion 36 that is disposed within the radially inwardly extending leg 16 and thereby provides rigidity to the radially inwardly extending leg 16. It should be understood that the insert 32 is optional and that its configuration can be modified based upon the desired characteristics of the mounting portion.

The axially extending leg 18 can extend from the mounting portion, and more particularly, from the radially inwardly extending portion 16 of the mounting portion 12. The axially extending leg 18 can gradually decrease in thickness from its proximal end connected to the mounting portion 12 to its distal end 18a where it is connected to the hinge portion 20.

The hinge portion 20 can extend both axially and radially inward from the end portion 18a of the axially extending leg 18. The hinge portion 20 preferably has a larger diameter than the distal end portion 18a of the axially extending leg 18 such that the hinge portion is more likely to bend or pivot relative to the end portion 18a rather than flexing itself. In an uninstalled condition, the main seal lip 22 extends from the hinge portion 20 at an angle α between 70° and 110° from the dust lip 24.

The main seal lip 22 can include a grooved contact surface such that the main seal lip operates by pumping oil through a precision molded spiral interfacing with the rotating shaft which directs oil back into the oil side of the seal. A raised bead portion 42 can be provided on a back side of the main seal lip 22 that provides a stiffening bead that serves as an integrally formed spring for biasing the sealing lip 22 against a rotary shaft for counteracting bell mouthing of the seal lip 22. Normally, the seal lip-free edge faces the oil side.

The seal 10 can be formed from elastomeric materials, such as rubber.

FIG. 2 shows the seal 10 in a normal installed position on a shaft S. In the normal installed position, the main seal lip 22 and the dust lip 24 are both in contact with the shaft S. The main seal lip 22 and the dust lip 24 each have a thickness less than a thickness of the hinge portion 20 and, therefore, the main seal lip and dust lip 24 deflect along their length thereof in order to accommodate engagement with the shaft S.

Figure 3:
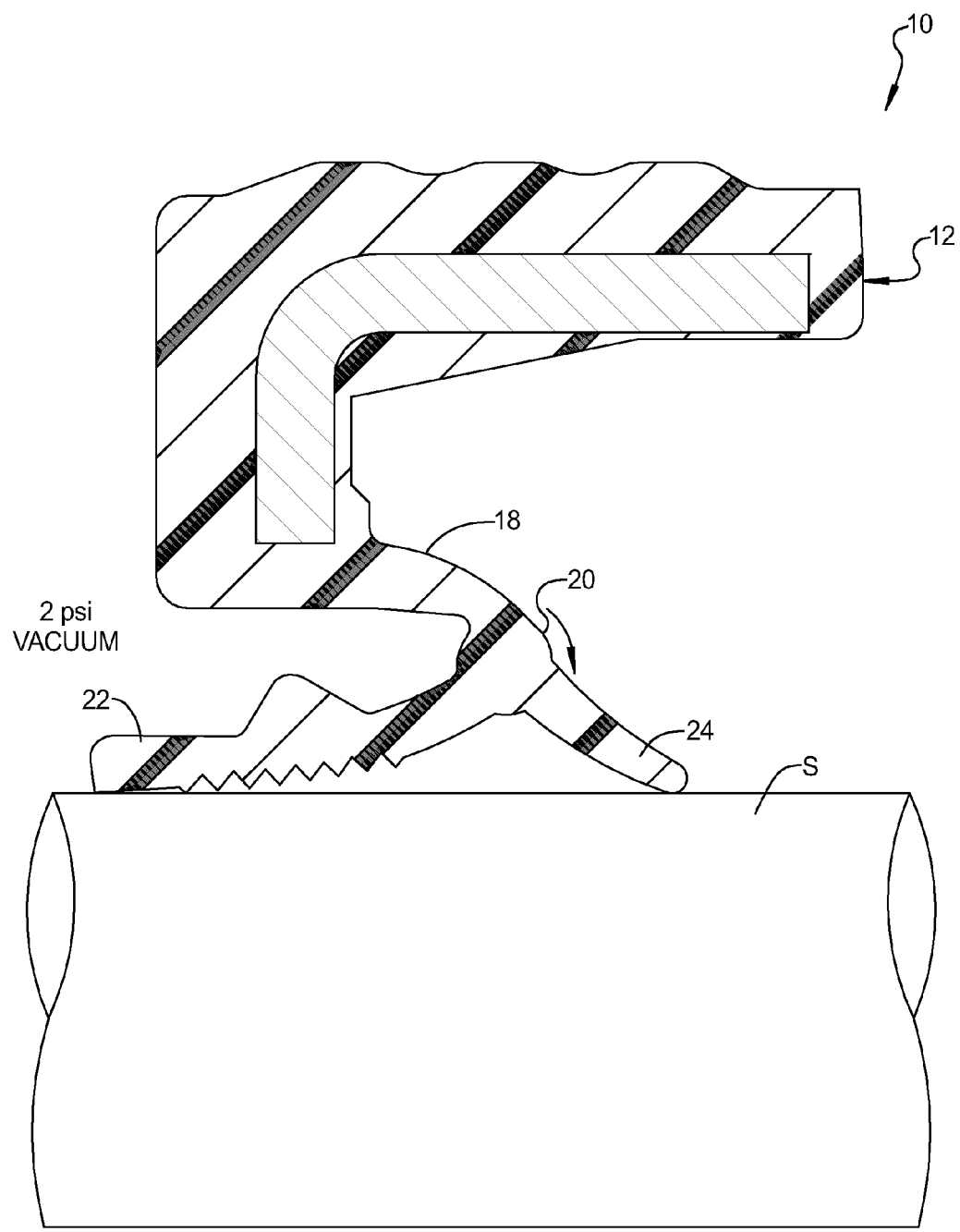
FIG. 3 is a cross-sectional view of the seal shown in FIG. 1 with the seal in an assembled state and with an exemplary 2 psi vacuum pressure applied thereto.

FIG. 3 illustrates the seal 10 in an assembled state with an exemplary 2 psi vacuum pressure applied thereto. In this condition, the main seal lip 22 begins to lift off of the shaft S and the hinge portion 20 begins to rotate in a clockwise direction, as illustrated in FIG. 3, thereby applying increased pressure to the dust lip 24 against the shaft S.

Figure 4:
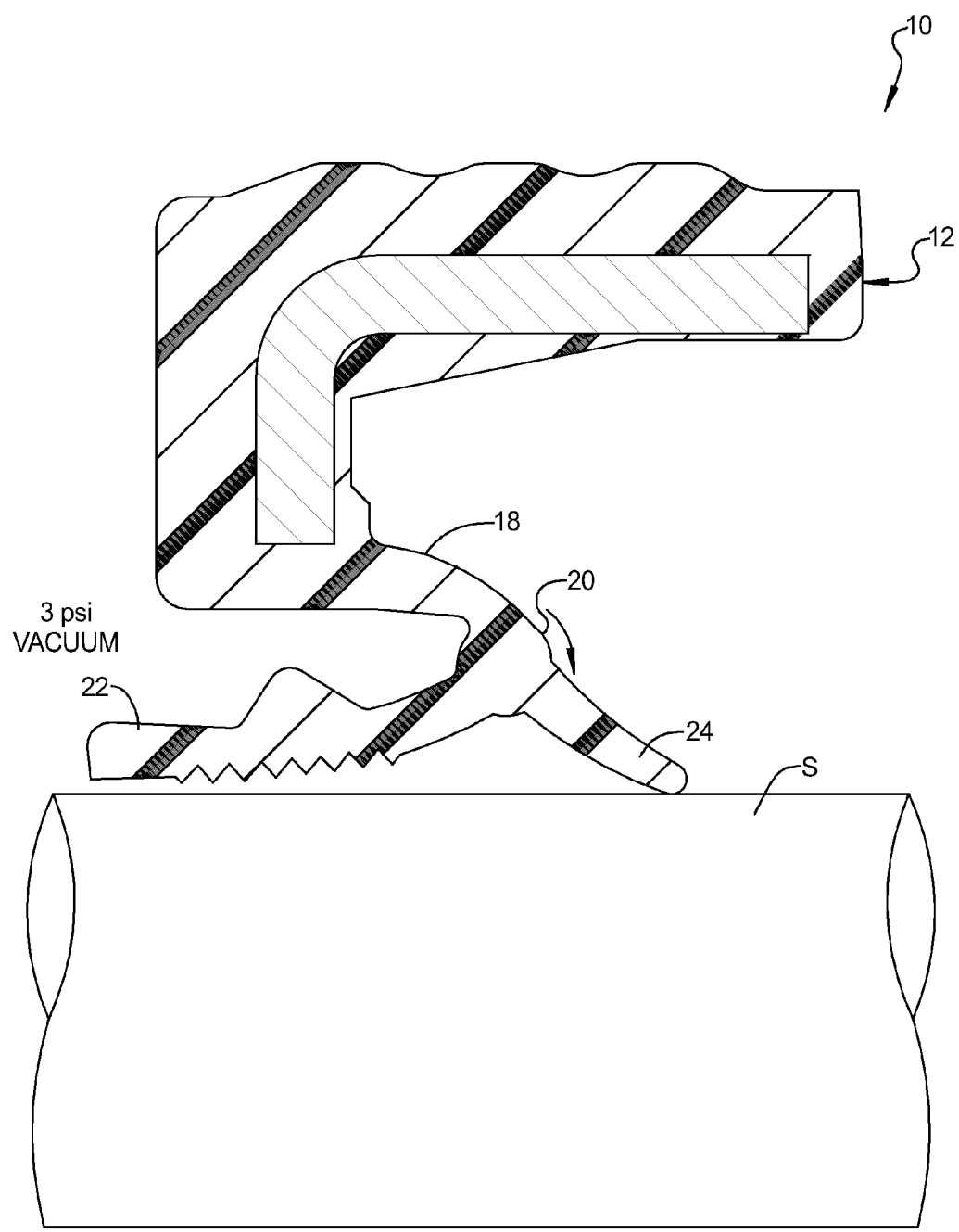
FIG. 4 is a cross-sectional view of the seal shown in FIG. 1 with the seal in an assembled state and with an exemplary 3 psi vacuum pressure applied thereto.

With reference to FIG. 4, an increased vacuum pressure of 3 psi is illustrated wherein the main seal lip 22 is lifted off of the shaft S and the hinge portion 20 is rotated even further in the clockwise direction, as illustrated in FIG. 4, thereby applying greater force against the dust lip 24 thus maintaining engagement with the shaft S.

The hinge portion 20 of the seal 10 enables the main lip 22 and dust lip 24 to rotate about a pivot point while maintaining the angle α between the main lip 22 and dust lip 14. By maintaining this angle, the seal has an improved performance for the ability to resist vacuum pressure at a reasonable shaft misalignment. Specifically, during vacuum pressure, the hinge portion helps in making the dust lip engage the shaft faster, thus maintaining a sealed contact. This hinge feature also delays the main lip lift-off during the vacuum process. The overlap of the two sealing contacts of the main lip to the shaft and the dust lip to the shaft at the same time will enable the seal to continuously provide a sealed engagement throughout the vacuum process.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A seal for sealing a space between an outer member and a shaft with a fluid side and an air side, comprising:
    a mounting portion having an outer diameter surface adapted to be received in a bore in the outer member;
    an axially extending leg extending in a first axial direction toward the air side of the seal from said mounting portion;
    a hinge portion disposed at an end of said axially extending leg, said hinge portion having at least three convex portions defining a larger diameter than said end of said axially extending leg;
    a main seal lip extending from said hinge portion in a first angled direction extending radially inward and in a second axial direction opposite said first axial direction and toward the oil side of said seal; and
    a dust lip extending from said hinge portion in a second angled direction extending radially inward and in said first axial direction, said seal having an installed condition engaging a shaft and an uninstalled condition wherein in the uninstalled condition, said main seal lip and said dust lip extend from said hinge portion at an angle of between 70° and 110° from each other and said main seal lip extends radially inward to a greater extent than said dust lip so as to cause said main seal lip to be moved to a greater extent than said dust lip in said installed condition and to cause said hinge portion to rotate relative to said end of said axially extending leg.

2. The seal according to claim 1, wherein said main seal lip includes a grooved contact surface.

3. The seal according to claim 1, wherein said main seal lip includes a region of increased thickness extending from a surface opposite to a contact surface of said main seal lip.

4. The seal according to claim 1, wherein said seal is formed from rubber.

5. The seal according to claim 1, wherein said mounting portion includes a metal insert having an axially extending leg generally parallel to said outer diameter surface and a radially inwardly extending leg extending from an end of said axially extending leg and disposed in a radially inwardly extending portion of said mounting portion.

6. The seal according to claim 1, wherein in an installed condition on a shaft, said main seal lip and said dust lip pivot with said hinge portion into engagement with the shaft.

7. The seal according to claim 1, wherein said main seal lip and said dust lip each have a thickness dimension less than the diameter dimension of said hinge portion.

8. A seal for sealing a space between an outer member and a shaft with a fluid side and an air side, comprising:

a mounting portion having an outer diameter surface adapted to be received in a bore in the outer member and a radially inwardly extending leg;

an axially extending leg extending in a first axial direction toward the air side from an inner end of said radially inwardly extending leg;

a hinge portion disposed at an end of said axially extending leg, said hinge portion having a generally round cross-section with a larger diameter than said end of said axially extending leg;

a main seal lip extending from said hinge portion in a first angled direction extending radially inward and in a second axial direction opposite said first axial direction; and a dust lip extending from said hinge portion in a second angled direction extending radially inward and in said first axial direction, said seal having an installed condition engaging a shaft and an uninstalled condition wherein in the uninstalled condition, said main seal lip and said dust lip extend from said hinge portion at an angle of between 70° and 110° from each other and said main seal lip extends radially inward to a greater extent than said dust lip so as to cause said main seal lip to be moved to a greater extent than said dust lip in said installed condition and to cause said hinge portion to rotate relative to said end of said axially extending leg.

9. The seal according to claim 8, wherein said main seal lip includes a grooved contact surface.

10. The seal according to claim 8, wherein said main seal lip includes a region of increased thickness extending from a surface opposite to a contact surface of said main seal lip.

11. The seal according to claim 8, wherein said seal is formed from rubber.

12. The seal according to claim 8, wherein said mounting portion includes a metal insert having an axially extending leg generally parallel to said outer diameter surface and a radially inwardly extending leg extending from an end of said axially extending leg and disposed in said radially inwardly extending leg of said mounting portion.

13. The seal according to claim 8, wherein in an installed condition on a shaft, said main seal lip and said dust lip pivot with said hinge portion into engagement with the shaft.

14. The seal according to claim 8, wherein said main seal lip and said dust lip each have a thickness dimension less than the diameter dimension of said hinge portion.

* * * * *